United States Patent [19]

Hayashi

[11] Patent Number: 5,429,363

[45] Date of Patent: Jul. 4, 1995

[54] RADIO TRANSMISSION SYSTEM FOR TV GAME MACHINE

[75] Inventor: Yoshikazu Hayashi, Inuyama, Japan

[73] Assignee: Makoto Yokota, Japan; a part interest

[21] Appl. No.: 86,663

[22] Filed: Jul. 2, 1993

[30] Foreign Application Priority Data

Jul. 6, 1992 [JP] Japan ................................ 4-178575

[51] Int. Cl.⁶ .............................................. A63F 9/24
[52] U.S. Cl. .................................. 273/148 B; 273/434
[58] Field of Search ................. 273/85 G, 148 B, 433, 273/434, 435, 436, 437, 438, 439, DIG. 28

[56] References Cited

U.S. PATENT DOCUMENTS

| | | | |
|---|---|---|---|
| 4,095,791 | 6/1978 | Smith et al. | 273/85 G |
| 4,151,407 | 4/1979 | McBride et al. | |
| 4,180,805 | 12/1979 | Burson | 273/85 G |
| 4,261,006 | 4/1981 | Weintraub et al. | 358/3 |
| 4,342,454 | 8/1982 | Baer et al. | 273/85 G |
| 4,771,344 | 9/1988 | Fallacaro et al. | 358/335 |
| 4,799,683 | 1/1989 | Bruner, Jr. | |
| 5,048,831 | 9/1991 | Sides | 273/85 G |
| 5,098,110 | 3/1992 | Yang | |

FOREIGN PATENT DOCUMENTS

| | | | |
|---|---|---|---|
| 2909044 | 9/1980 | Germany. | |
| 53-135665 | 11/1978 | Japan. | |
| 2136303 | 9/1984 | United Kingdom | 273/439 |

*Primary Examiner*—Jessica J. Harrison
*Attorney, Agent, or Firm*—Davis, Bujold & Streck

[57] ABSTRACT

A radio transmission apparatus for TV game machine, a radio transmission adaptor connectable to a main body of existing TV game machine, and a TV game cassette provided with a radio transmitting antennae are disclosed as radio transmission system for TV game machine. According to the radio transmission system, radio frequency output signals representing game data contained in TV game cassette is amplified and transmitted by radio to feeder or indoor antennae connected to TV set having no special receiving portion to receive the transmitted game data, thereby attaining wireless transmission of game data.

6 Claims, 7 Drawing Sheets

RADIO TRANSMISSION SYSTEM FOR TV GAME MACHINE

BACKGROUND OF THE INVENTION

This invention relates to radio transmission system for TV game machine. Specifically, this invention relates to a radio transmission apparatus for TV game machine, a radio transmission adaptor connectable to a main body of existing TV game machine, and a TV game cassette provided with a radio transmitting antennae.

In a conventional TV game machine, a main body of TV game machine is connected via wires to a TV set for domestic use as image receptor, thereby sending game data consisting of visual and occasionally plus aural information to the TV set. This is because radio frequency signals output from the main body of TV game machine is very weak and require to be directly transmitted on lines from RF output terminals of the main body of TV game machine to RF input terminals of the TV set.

Accordingly, when starting a TV game, a feeder of TV set is to be disconnected and replaced with connecting lines of TV game machine. On the other hand, another type of TV game machine is known which is provided with RF switching circuit for switching the function between ordinary TV program mode and TV game mode, thus relieving a user of the labor to rearrange the connecting lines between the TV set and the TV game machine. Specifically, in the latter type of TV game machine, both of the feeder and the connecting lines of TV game machine are permanently connected to the TV set via the RF switching circuit. Thus, either function of the TV set and the TV game machine can be obtained by switching at the RF switching circuit.

However, in both types of the above TV game machine, the main body of TV game machine is connected by wires to the TV set. Due to the wires connecting the TV set and the TV game machine, the TV game machine must be placed within a corresponding limited distance from the TV set. The wires are also nuisance for passage. Further, both types of the TV game machine requires a user to approach to them, even once and for all, for rearranging connection between the feeder and the lines of the TV game machine or for switching connection between the TV set and the TV game machine. As a result, the user tends to start the TV game there, right in front of the TV set.

It is widely asserted that keeping a certain distance in watching television leads to prevention of myopia and other eyesight problems. In view of the fact that most players of TV game are younger children and because of the recent trend in wider screen of TV set, the assertion will see a rise in its earnest.

Meanwhile, remote control for TV set has become practically commonplace in switching on and off, channel selection, and other controls over TV set, and reveals no problem in the aforementioned respect. A conventional TV game machine, on the other hand, requires a user to connect lines for transmitting visual and aural information, or to switch function between TV program mode and TV game mode.

Japanese Laid-open Patent Application NO. 53-135665 discloses of a method for radio transmitting control instructions between a main body of TV game machine and its controllers having control buttons. Also in this prior art, the main body of TV game machine and TV set are connected using wires.

If control instructions is transmitted, for instance, on infrared rays as in remote controller of TV set, the control instructions is cut off now and then whenever there is a blockage by passenger between controller and a main body of TV game machine. In contrast to the remote control in watching TV program, the controllers for TV game machine is operated very often or occasionally continuously. Blockage by passenger results in interference in game, and thus proves it is not feasible for TV game machine to send controlling instructions using infrared rays.

In the case where a child borrows a TV game machine to play it in his home, or where he wishes to bring his TV game machine to a camp or for travel, the conventional TV game machine requires first to be disconnected from the TV set. Next, recipient TV set must be disconnected from its feeder and reconnected to lines of the TV game machine he borrows.

SUMMARY OF THE INVENTION

Wherefore, an object of this invention is to provide a radio transmission system of TV game machine.

In order to attain stated object, this invention provides a radio transmission apparatus for TV game machine. The radio transmission apparatus is integrally provided on a main body of TV game machine which sends out game data consisting of visual information or of visual and aural information to TV set, and includes amplifier for amplifying RF output signals representing game data. The radio transmission apparatus also includes a transmitting antennae for transmitting the amplified RF output signals to indoor antennae or feeder connected to the TV set.

This invention also provides a radio transmission adaptor connectable to a main body of TV game machine which sends out game data consisting of visual information or of visual and aural information to TV set. The radio transmission adaptor includes input terminal connectable to RF output terminals or video signals output terminals provided on the main body of TV game machine. The radio transmission adaptor also includes amplifier for amplifying the RF signals or video signals input from the input terminals. The radio transmission adaptor further includes transmitting antennae for transmitting the RF signals or video signals amplified by the amplifier to indoor antennae or feeder connected to the TV set.

The invention further provides a TV game cassette provided with radio transmitting antennae. The TV game cassette is inserted to a main body of TV game machine, and contains game data consisting of visual information or visual and aural information. The game cassette includes radio transmitting antennae for transmitting RF output signals read out at the main body of TV game machine to indoor antennae or feeder connected to TV set.

By utilizing the present radio transmission apparatus, the RF output signals of game data output from the main body of TV game machine is amplified by the amplifier and transmitted from the transmitting antennae to indoor antennae or feeder connected to TV set.

By utilizing the present radio transmission adaptor, by connecting input terminals of the radio transmission adaptor to existing RF output terminals or video signals output terminals provided on a main body of TV game machine, RF signals or video signals input from the input terminals are amplified by the amplifier, and transmitted from the transmitting antennae to indoor antennae or feeder connected to the TV set. Therefore, even a conventional TV game machine can attain wireless transmission of game data when provided with the present radio transmission adaptor.

By utilizing the present TV game cassette provided with the radio transmitting antennae, a TV game machine without any radio transmitting antennae can attain wireless transmission of RF output signals representing game data readout from a TV game cassette to indoor antennae or feeder connected to TV set from the radio transmitting antennae provided on the TV game cassette.

Thus, the present radio transmission system needs no special receiving portion on the TV set in attaining wireless transmission. Since the present system does not transmit signals by infrared rays, nor receives the signals at special receiving portion, transmission failure due to blockage is successfully prevented.

DETAILED DESCRIPTION OF THE PREFERRED EMBODIMENT

Embodiments of the present are explained hereunder referring to the drawings although it is understood the other embodiments are within the scope of the present invention. Similar components have been given similar numerals throughout the embodiments.

Embodiment 1

A TV game system explained hereinafter adopts a radio transmission adaptor 1 shown in FIGS. 1 and 2. As shown in FIG. 2, the TV game system includes a main body of TV game machine 10 for reading out game data consisting of visual, or visual and aural information from a TV game cassette 40 and outputting the game data, controllers 20 for sending out controlling instructions directed by a user, and a TV set 30 for outputting the game data in the form of image or sound.

On upper surface of the main body of TV game machine 10, there are provided a cassette receiving portion 11, power switch 13, eject button 15, and reset button 17. Two controllers 20, 20 are provided on sides of the main body of TV game machine 10 for allowing two players to play at a time. The controllers 20 are provided with control buttons 21 including a joy stick and other buttons to input controlling instructions. Further details of the structure is known and therefore is omitted to be explained.

Figure 1:
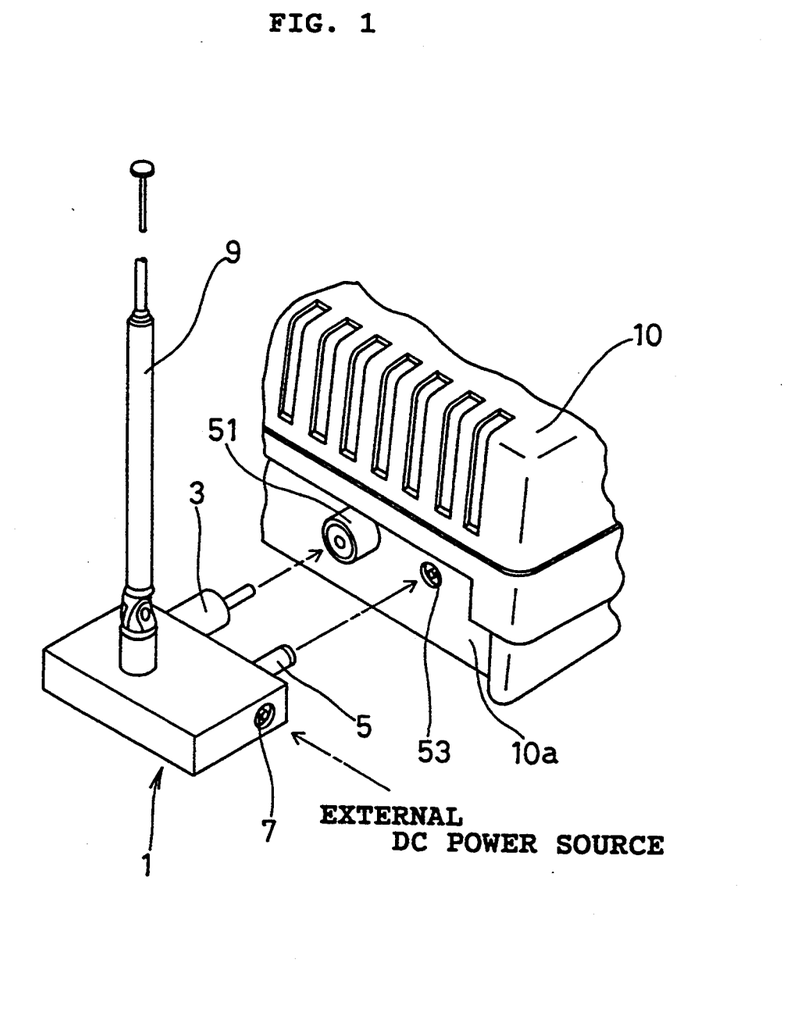
FIG. 1 is a perspective view showing a radio transmission adaptor according to the present invention.
Figure 2:
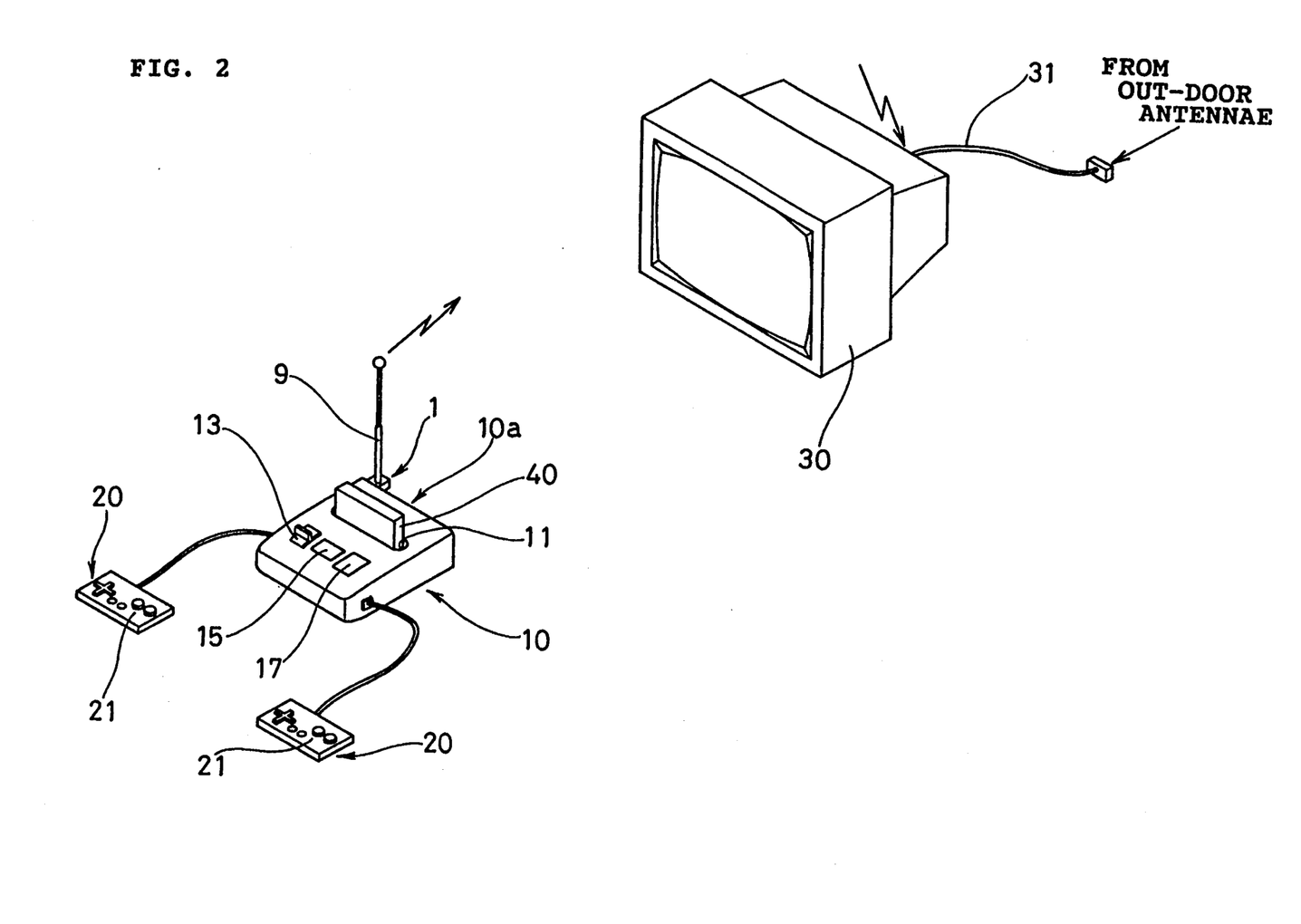
FIG. 2 is a perspective view showing a TV game machine using the radio transmission adaptor.

On the front side 10a of the main body of TV game machine 10, provided are RF output terminal 51 and DC power input terminal 53, as shown in FIG. 1. The RF output terminal 51 is existing terminal which is conventionally connected to RF input terminal (not shown) of TV set 30. The radio transmission adaptor 1 of this embodiment is provided with adaptor RF input terminal 3 connectable to the RF output terminal 51, and adaptor power output terminal 5 connectable to the DC power input terminal 53.

The radio transmission adaptor 1 is also provided with adaptor power input terminal 7 for receiving direct current power supplied from external power source. The structure of the adaptor power input terminal 7 is similar to that of the DC power input terminal 53 provided on the main body of TV game machine 10. The radio transmission adaptor 1 is further provided with transmitting antennae 9 for transmitting the RF signals input from the adaptor RF input terminal 3 to feeder 31 connected to the TV set 30 or to indoor antennae (not shown). The RF signals referred to in the instant description is such radio frequency signals a TV set can receive in the same manner as in receiving broadcast waves.

Figure 3:
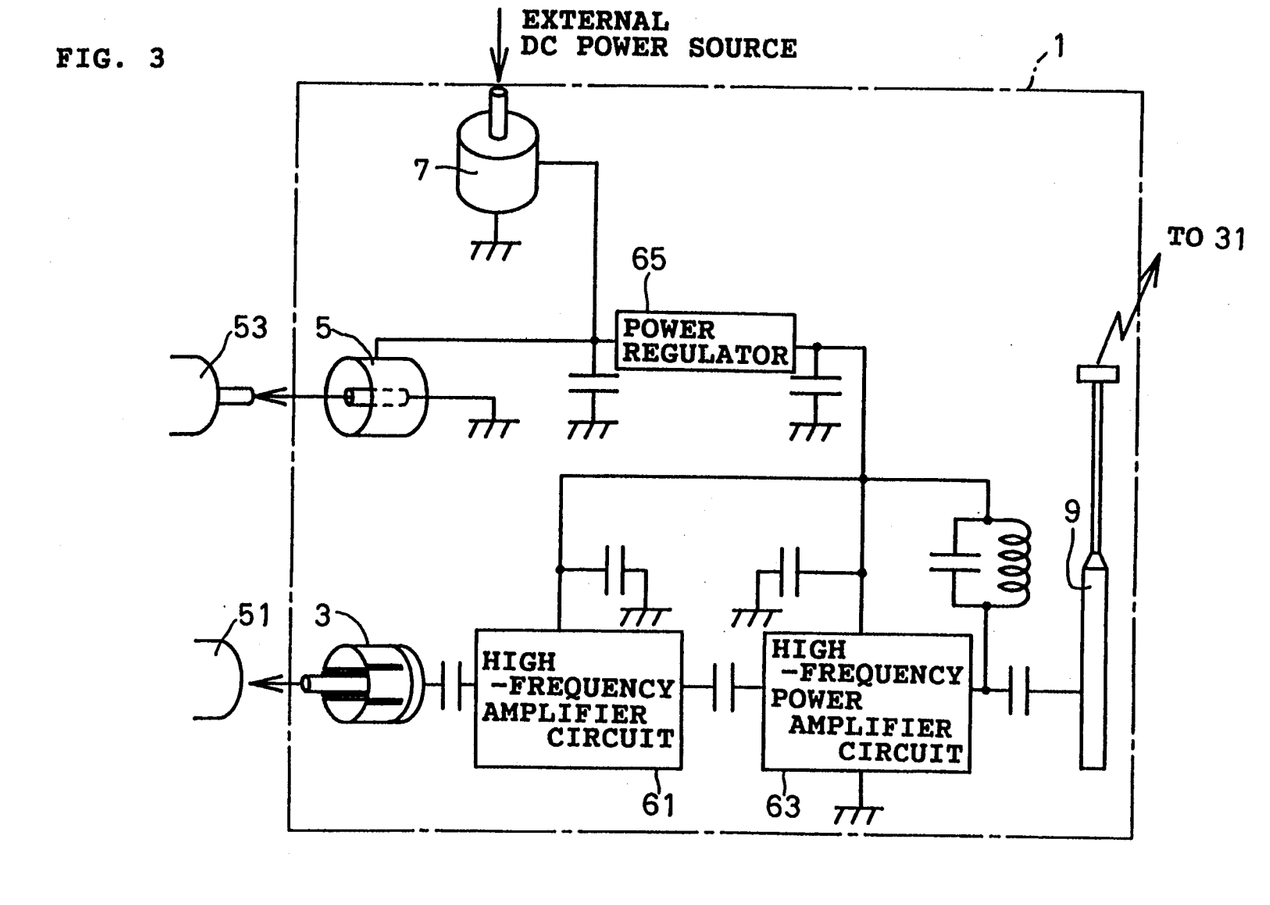
FIG. 3 is a circuit diagram of the radio transmission adaptor according to the present invention.

As shown in a circuit diagram of FIG. 3, a high frequency amplifier circuit 61 and a high frequency power amplifier circuit 63 intermediate between the adaptor RF input terminal 3 and the transmitting antennae 9. Thus, power and the weak RF signals output from the RF output terminal 51 of the main body of TV game machine 10 is amplified such that the RF signals are fit to be transmitted by radio.

Power is supplied from external power source via adaptor power input terminal 7 and adaptor power output terminal 5 to the main body of TV game machine 10. On the other hand, the adaptor power input terminal 7 is connected via power regulator 65 to the high frequency amplifier circuit 61 and the high frequency power amplifier circuit 63. Thus the radio transmission adaptor 1 is activated when supplied with power from the power regulator 65.

Accordingly, by connecting the adaptor RF input terminal 3 of the radio transmission adaptor 1 to the RF output terminal 51 of the main body of TV game machine 10, the RF signals input at the main body of TV game machine 10 is amplified, and transmitted from the transmitting antennae 9 to the feeder 31 or indoor antennae connected to the TV set 30.

Thus, even an existing main body of TV game machine 10 that is connected conventionally by wires can attain wireless transmission of game data to the TV set 30 having no special receiving portion. Consequently, a player starts to play a TV game sufficiently remotely from the TV set 30. Subsidiary benefits in respect of eyesight can also be yielded for younger children who enjoy playing TV game on a wide screen. Moreover, transmission failure due to blockage is not caused.

Even in the case where a child borrows a TV game machine to play it in his home, or where he wishes to bring his TV game machine to a camp or for travel, the present system for TV game requires no rearrangement of wires and lines. Specifically, since the present system remains unconnected to the TV set on a daily basis, the labor to disconnect the TV game machine from TV set 30 is unnecessary. Also at recipient TV set 30, disconnectionof feeder from TV set 30 and reconnection to lines of the TV game machine is no more required. The present systems proves to be advatageous also in respect of portability.

Embodiment 2

Explained hereinafter is another embodiment of the present invention where a main body of TV game machine is integrally provided with radio transmission apparatus.

Figure 4:
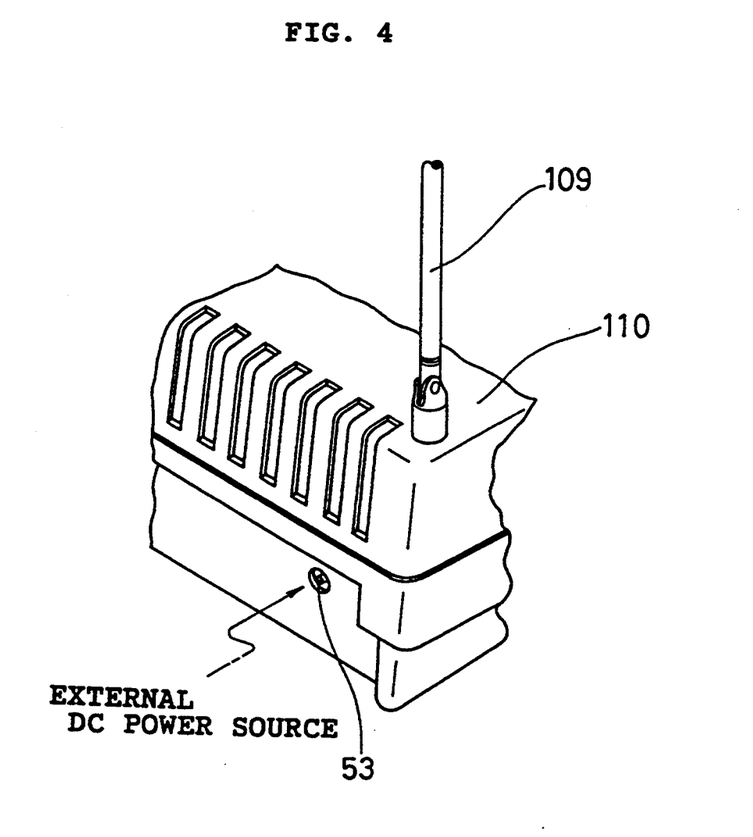
FIG. 4 is a perspective view showing a main body of TV game machine with the radio transmission apparatus integrally provided.
Figure 5:
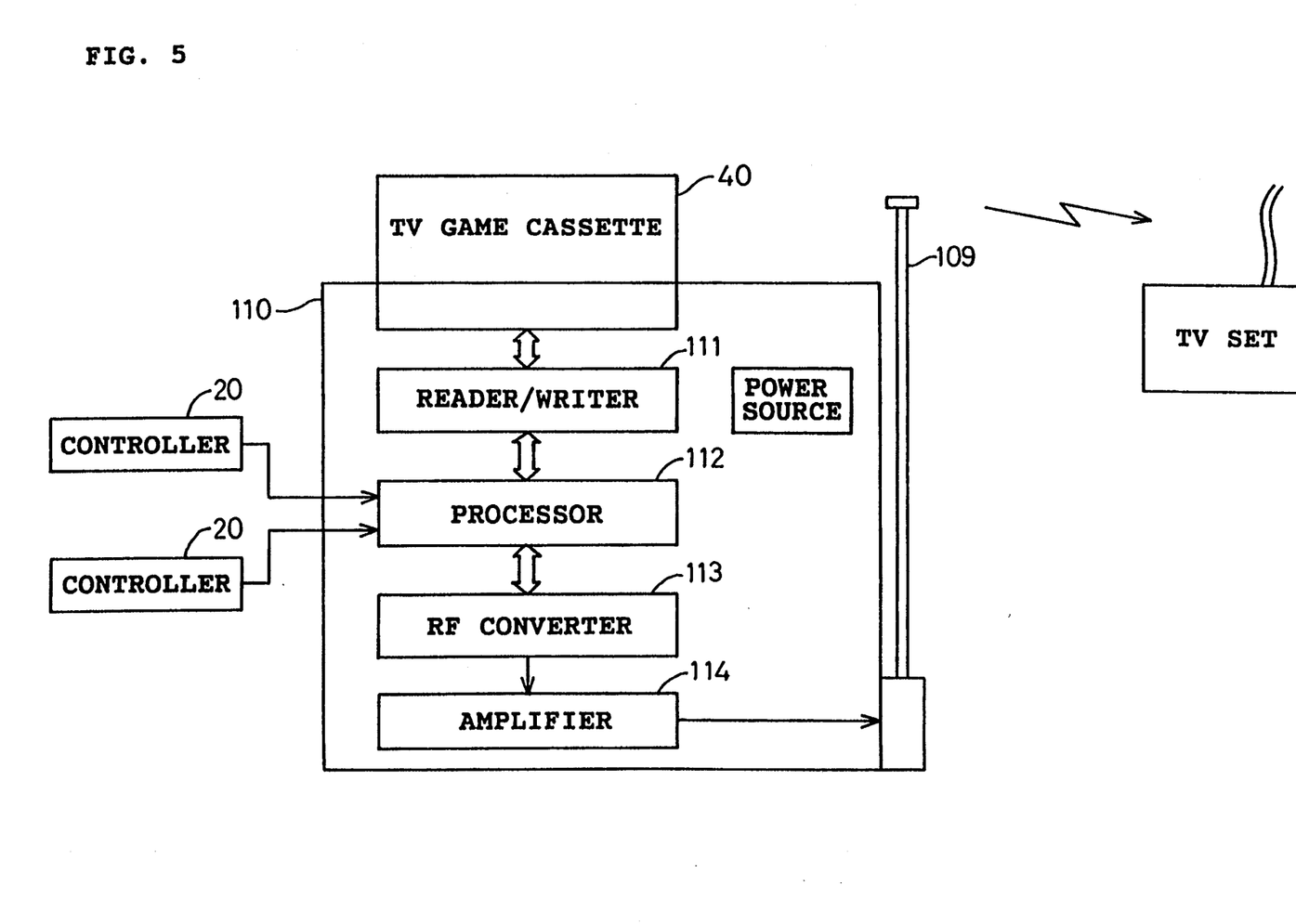
FIG. 5 is a block diagram showing structure of a main body of TV game machine integrally provided with radio transmission apparatus of the second embodiment.

Inside a main body of TV game machine 110, there are provided components similar to the high frequency amplifier circuit 61, high frequency power amplifier circuit 63, and power regulator 65 shown in FIG. 3. The main body of TV game machine 110 also includes integrally provided transmitting antennae 109, as shown in FIG. 4. By these components, i.e. the transmitting antennae 109 and components similar to the high frequency amplifier circuit 61, high frequency power amplifier circuit 63, and power regulator 65, a radio transmission apparatus of the instant embodiment is structured. As shown in FIG. 5, the main body of TV game machine 110 includes, similarly to a conventional TV game machine, reader/writer 111 for reading out and writing to game data contained in TV game cassette 40, processor 112 for processing the game data read out, and RF converter 113 for converting the processed game data to radio frequency signals. The main body of TV game machine 110 according to the present invention further includes amplifier 114. The amplifier 114 corresponds to high frequency amplifier circuit 61 and high frequency power amplifier circuit 63 specified in the first embodiment. Thus, the game data is read out, processed, converted to RF signals, amplified, and transmitted to TV set from the transmitting antennae 109.

Since the main body of TV game machine 110 requires no connection by lines from the beginning, the RF output terminal 51 provided on an existing main body of TV game machine 10 shown in FIG. 1 is not provided. DC power input terminal 53 shown in FIG. 4 to receive power from external power source may be alternatively replaced with dry batteries or battery pack, thereby making the input and output of the main body of TV game machine 110 totally wireless.

Embodiment 3

Figure 6:
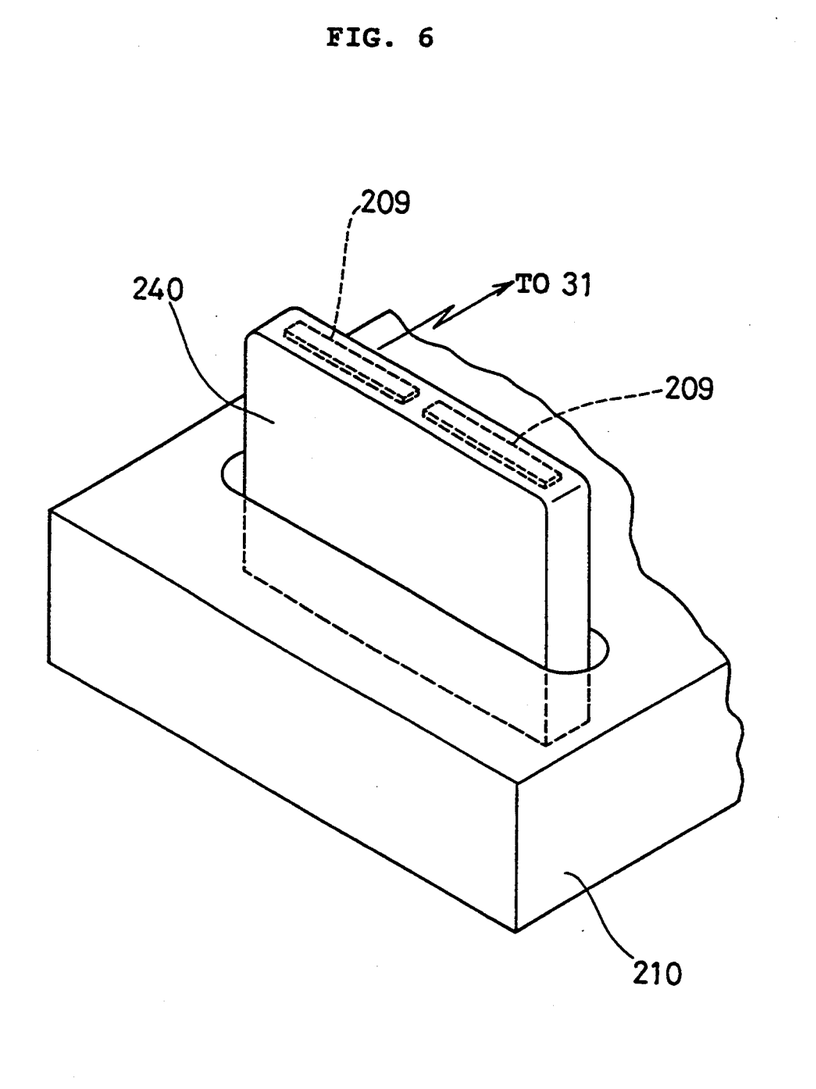
FIG. 6 is a perspective view showing the TV game cassette provided with a radio transmitting antennae.
Figure 7:
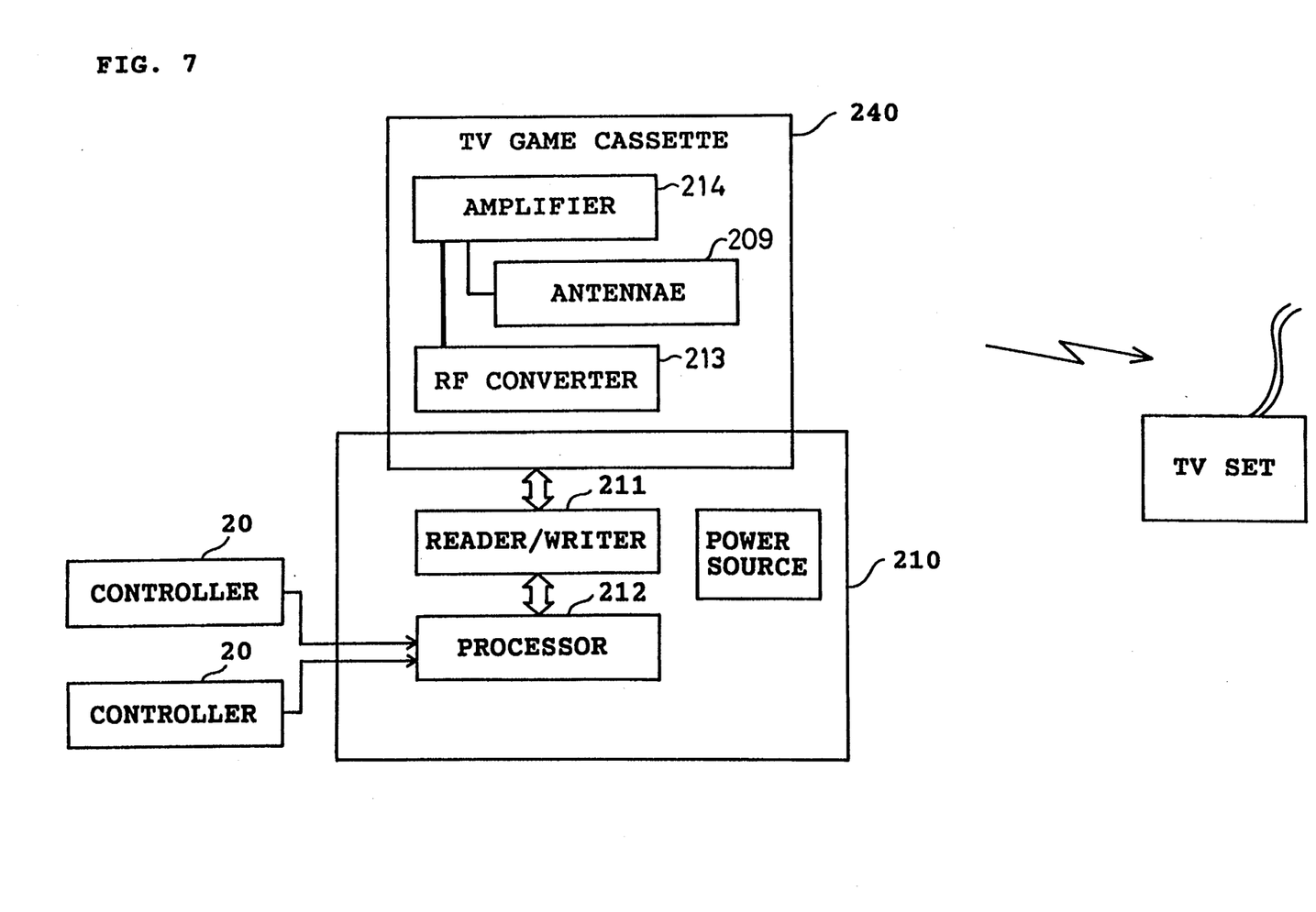
FIG. 7 is a block diagram showing structure of TV game cassette according to the present invention.

In this embodiment, a transmitting antennae 209 is provided not on a main body of TV game machine 210, but on a TV game cassette 240, as shown in FIGS. 6 and 7. The TV game cassette 240 also includes amplifier 214 and RF converter 213. Game program is first read out at reader/writer 211 provided in the main body of TV game machine 210, processed by processor 212 also provided in the main body of TV game machine 210, and output as game data. The game data is next converted to the same radio frequency signals as broadcast waves by the RF converter 213 provided at the TV game cassette 240, amplified by the amplifier 214, and consequently transmitted to TV set by the antennae 209. Since the transmitting antennae 209 is installed inside the TV game cassette 240, the transmitting antennae 209 is preferably smaller in size, and may be, for example, bar antennae or micro-strip antennae.

By virtue of provision of the transmitting antennae 209 at the TV game cassette 240, even if the main body of TV game 210 is not provided with a transmitting antennae, the RF output signals of game data read out from the TV game cassette 240 is transmitted by radio to feeder 31 or in-door antennae connected to the TV set 30 from the transmitting antennae 209 inside the TV game cassette 240.

Both of the main body of TV game machine 110 with radio transmission apparatus integrally provided and the TV game cassette 240 provided with radio transmitting antennae attain wireless transmission of game data without requiring any special portion on the TV set to receive transmission, and are also advantageous in respect of portability as in the radio transmission adaptor 1 of the first embodiment.

Wherefore, having described the present invention, what is claimed is:

1. A portable radio transmission adaptor for connection to a TV game machine which has a power input terminal for receiving electrical power and a signal output terminal for sending at least one of visual and aural game signals, during operation of the TV game machine, to a TV set to display the game signals; said adaptor comprising:
   an adaptor power output terminal for connection to the power input terminal of the TV game machine to provide power thereto from a power source; and
   an adaptor input terminal for connection to the signal output terminal of the TV game machine to receive game signals therefrom;
   wherein said adaptor power output terminal and said adaptor input terminal are arranged to matingly engage with a corresponding power input terminal and signal output terminal, respectively, of the TV game machine, when said radio transmission adaptor is connected with the TV game machine;
   amplifier means for amplifying the game signals received by said adaptor input terminal from the TV game machine; and
   a transmitting antennae for transmitting the game signals amplified by said amplifier means to one of an indoor antennae and a feeder mechanism which is connected to a TV set for displaying the transmitted game signals.

2. A radio transmission adaptor according to claim 1, wherein said adaptor further comprises an adaptor power input terminal connected with said adaptor power output terminal for providing power to said amplifier means.

3. A radio transmission adaptor, according to claim 1, in combination with a TV game machine which has a power input terminal for receiving electrical power and a signal output terminal for sending at least one of visual and aural game signals, during operation of said TV game machine, to a TV set to display the game signals, said adaptor power output terminal is engaged with said power input terminal of said TV game machine and said adaptor input terminal is engaged with said signal output terminal of said TV game machine so that said TV game machine sends, during operation, game signals consisting of one of visual and visual and aural information to a TV set via said adaptor.

4. A portable radio transmission adaptor for connection to a TV game machine which has a power input terminal for receiving electrical power and a signal output terminal for sending video game signals, during operation of said TV game machine, to a TV set to display the game signals, said adaptor comprising:
   an adaptor power output terminal for connection to the power input terminal of the TV game machine to provide power thereto from a power source; and an adaptor input terminal for connection to the signal output terminal of the TV game machine to receive game signals therefrom;

wherein said adaptor power output terminal and said adaptor input terminal are arranged to matingly engage with a corresponding power input terminal and signal output terminal, respectively, of the TV game machine, when said radio transmission adaptor is connected with the TV game machine;

amplifier means for amplifying the game signals received by said adaptor input terminal from the TV game machine; and a transmitting antennae for transmitting the game signals amplified by said amplifier means to one of an indoor antennae and a feeder mechanism which is connected to a TV set for displaying the transmitted game signals.

5. A portable TV game machine comprising:

a housing having a cassette receiving portion for releasably receiving a TV game cassette containing a game program;

read means communicating with said cassette receiving portion for reading the game program from said TV game cassette;

at least one input controller means electrically connected to said TV game machine by a wire connected with said housing, said at least one input controller means including at least one control button for inputting operational instructions of a player of the game program;

processing means provided in said housing, communicating with said read means and said at least one controller means, for processing and outputting game data including visual information based on the operational instructions input by said at least one input controller means and the game program read from said TV game cassette;

converting means provided in said housing and communicating with said processing means for converting the game data output from said processing means to radio frequency signals of a same radio frequency as a broadcast wave;

amplifying means provided in said housing and communicating with said converter means for amplifying the radio frequency signals converted by said converting means; and a transmitting antennae provided in said housing and communicating with said amplifying means for transmitting the radio frequency signals amplified by said amplifying means as radio transmission signals to one of an indoor antennae and a feeder mechenism connected to a TV set for displaying the game signals.

6. A TV game machine according to claim 5, wherein said TV game machine includes at least a second input controller means electrically connected to said TV game machine by a wire connected with said processing means, said second input controller means includes at least one control button for inputting operational instructions of a second player of the game program.

* * * * *